United States Patent [19]

Kishimoto

[11] 4,071,474
[45] Jan. 31, 1978

[54] SECONDARY-ELECTRON MULTIPLIER DYNODE

[75] Inventor: Yoshio Kishimoto, Hirakata, Japan

[73] Assignee: Matsushita Electric Industrial Co., Ltd., Osaka, Japan

[21] Appl. No.: 621,794

[22] Filed: Oct. 14, 1975

[30] Foreign Application Priority Data

Oct. 14, 1974 Japan ............................. 49-119085
Nov. 19, 1974 Japan ............................. 49-133969

[51] Int. Cl.² ............................................. H01B 1/04
[52] U.S. Cl. ................................ 252/500; 428/423; 313/103 CM; 313/105 CM
[58] Field of Search .................. 252/500; 428/423; 313/103 CM, 105 CM

[56] References Cited

U.S. PATENT DOCUMENTS 3,424,698  1/1969  Lupinski et al. ..................... 252/500
3,448,177  6/1969  Goodings et al. ................. 252/500 X
3,808,494  4/1974  Hayashi et al. ............... 313/105 CM

FOREIGN PATENT DOCUMENTS 1,118,331  7/1968  United Kingdom ......... 313/105 CM

Primary Examiner—Benjamin R. Padgett
Assistant Examiner—E. Suzanne Parr
Attorney, Agent, or Firm—Burgess, Ryan and Wayne

[57] ABSTRACT

A surface layer type secondary-electron multiplier consisting of a support and a secondary-electron emissive and electron-conductive high-polymer layer formed thereupon is disclosed. For forming the secondary-electron emission layer, paint consisting of an electron-conductive high-polymer dissolved or suspended in solvents is used. Alternatively, the support may consist of a nitrogen- or sulphur-containing electron-donor polymeric composition which may be molded or formed, and a charge-transfer complex conductive layer may be formed upon the support.

14 Claims, 17 Drawing Figures

FIG. 12A'
(TABLE-1a)

POLYMER

| MARK | MATERIAL | CHEMICAL STRUCTURE | δMAX | EpMAX(eV) | REF |
|---|---|---|---|---|---|
| PI | POLYIMIDE | $-[N\langle^{CO}_{CO}\rangle\bigcirc\langle^{CO-}_{CO-}\rangle N]_n-$ | 1.9 | 150 | 4 |
| XY | XYLENE-RESIN | $-CH_2-\bigcirc(CH_3)(CH_2-CH(OH)-\bigcirc(CH_3)(CH_2-CH_3)$ | 1.8 | 200 | EX |
| PC | POLYCARBONATE | $-[\bigcirc-C(CH_3)_2-\bigcirc-O-CO-O]_n-$ | 1.9 | 200 | EX |
| PS | POLYSTYRENE | $-[CH_2-CH(\bigcirc)]_n-$ | 3.0*<br>2.1 | 250*<br>250 | 4*<br>— |
| PE | POLYETHYLENE | $-[CH_2-CH_2]_n-$ | 2.85 | 250 | — |
| PVC | POLYVINYL CHLORIDE | $-[CH_2-CH(Cl)]_n-$ | 2.5 | 250 | EX |
| PTFE | POLYTETRAFLUO-ETHYLENE | $-[CF_2-CF_2]_n-$ | 3.0 | 300 | 4 |

| | | | | | |
|---|---|---|---|---|---|
| PA | POLYAMIDE (NYLON 6) | $-(C_5H_{10}NHCO)_n-$ | 2.5 | 250 | EX |
| PVAc | POLYVINYL ACETATE | $-(CH_2-CH(OCOCH_3))_n-$ | 2.9 | 250 | EX |
| PET | POLYETHYLENE TEREPHTHALATE | $-(OC-C_6H_4-COOCH_2CH_2O)_n-$ | 4.8 / 3.2 | 175 / 250 | 4 |
| PSI | POLYSILOXANE | $-(Si(H)_2-O)_n-$ | 2.0 | 200 | 5 |
| PDSI | POLYDIMETHYL-SILOXANE | $-(Si(CH_3)_2-O)_n-$ | 2.35 | 200 | EX |

| FIG. 12A |
|---|
| FIG. 12A' |
| FIG. 12A" |

1) MATSKEVICH T.L, MIKHAILOVA E.G, SOVIET PHYS-SOLID STATE 2 655 (1960)
4) WILLIS R.F, SKINNER D.K, SOLID STATE COMMUN. 13(6) 685 (1973)
5) GOTO K, ISHIKAWA K, JAPAN J. APPL. PHYS. 6 1329 (1967)
EX: EXPERIMENTAL DATA BY AUTHORS.

FIG. 12B"

| LT | Li TCNQ | $Li^+ \left( \begin{array}{c} NC \\ NC \end{array} \right) C \bigcirc C \left( \begin{array}{c} CN \\ CN \end{array} \right)^{\bar{\ }}$ | 1.33 | 200 | EX |
|----|---------|---|------|-----|----|
| NT | Na TCNQ | $Na^+ \left( \begin{array}{c} NC \\ NC \end{array} \right) C \bigcirc C \left( \begin{array}{c} CN \\ CN \end{array} \right)^{\bar{\ }}$ | 1.6 | 200 | EX |
| KT | K TCNQ | $K^+ \left( \begin{array}{c} NC \\ NC \end{array} \right) C \bigcirc C \left( \begin{array}{c} CN \\ CN \end{array} \right)^{\bar{\ }}$ | 1.6 | 200 | EX |
| C | GRAPHITE | (graphite structure) | 1.0 | 300 | 1 |
| IC | ICE | H—O—H | 2.3 | 300 | 2 |

| FIG. 12B |
|---|
| FIG. 12B' |
| FIG. 12B" |

1) MATSKEVICH T.L., MIKHAILOVA E.G. SOVIET PHYS-SOLID STATE 2 655 (1960)
2) MARTSINOVSKAYA E.G., SOVIET-SOLID STATE 7(3) 661 (1965)
3) BUBNOV L. Ya, FRANKEVICH E.L, PHYS. STATUS SOLIDI B BASIC RES. 62 (1) 281 (1974)

EX. DATA FROM EXPERIMENTS BY INVENTORS

FIG. 12B'
(TABLE-1b)

ORGANIC CRYSTAL

| MARK | MATERIAL | CHEMICAL STRUCTURE | $\delta_{MAX}$ | $E_{pMAX}$ (eV) | REF |
|------|----------|--------------------|----------------|-----------------|-----|
| BE | BENZENE | | 1.66 | 200 | 2 |
| NA | NAPHTHALENE | | 1.52 | 300 | 2 |
| AN | ANTHRACENE | | 1.38 | 400* / 200 | 2* / 3 |
| PH | PHENANTHRENE | | 1.55 | 300 | 2 |
| DI | DIPHENYL | | 1.7 | 400 | 2 |
| TE | TETRACENE | | 1.46 | 200 | 3 |
| PY | PYRENE | | 1.50 | 250 | 3 |

FIG. 13A
(TABLE - 2)

MAXIMUM S.E.E. YIELD AND IONIZATION POTENTIAL

| MATERIAL | $\delta$ MAX | Is (eV) | REF. | $\pi e$ | $\sigma b$ | $\sigma b/\pi e$ |
|---|---|---|---|---|---|---|
| BENZEN | 1.66 | — | 1 | 6 | 6 | 1.0 |
| NAPHTHALENE | 1.52 | 6.76 / 6.84 | 6 | 10 | 8 | 0.8 |
| ANTHRACENE | 1.38 | 5.65 | 6 | 14 | 10 | 0.71 |
| PHENANTHRENE | 1.70 | 6.45 | 6 | 14 | 10 | 0.71 |
| TETRACENE | 1.46 | 5.28 | 6 | 18 | 12 | 0.67 |
| PYRENE | 1.50 | 5.6 / 5.8 | 6 | 16 | 10 | 0.62 |
| DIPHENYL | 1.60 | — | 1 | 12 | 11 | 0.92 |
| GRAPHITE | 1.0 | 4.83 | 7 | 8 | 0 | 0 |

FIG. 13

| FIG. 13A |
|---|
| FIG. 13B |

FIG. 13B

| POLYETHYLENE | 2.8 | 8.5 | 9 | 0 | 6 | 8 |
|---|---|---|---|---|---|---|
| POLYSTYRENE | 2.1 | 7.0 | 10 | 6 | 11 | 1.83 |
| Na TCNQ | 1.6 | 5.6 | 8 | — | — | — |

6) BATLEY M, LYONS L.E, MOLECULAR CRYSTAL 3 357 (1968)

7) GUTMANN F, LYONS L.E, "ORGANIC SEMICONDUCTORS" JOHN WILEY, NEW YORK P689 (1967)

8) NIELSON P, EPSTEIN A.J, SANDMAN D.J, SOLID STATE COMMUM. 15 (1) 53 (1974)

9) FUJIHIRA M, INOKUCHI H, CHEM. PHYS. LETTER 17 (4) 554 (1972)

10) VILESOV F.I, et. al. SOVIET PHYS-SOLID STATE 11 (11) 2775 (1972)

11) VILESOV F.I, DOKL. AKAD. NAUK. SSSR 132 632 (1960)

SECONDARY-ELECTRON MULTIPLIER DYNODE

BACKGROUND OF THE INVENTION

The present invention relates to a secondary-electron multiplier adapted to be incorporated in a secondary-electron multiplier section of a mass spectrometer, ion detector, photomultipler or image intensifier in order to attain a stable and simple amplification of the electrons produced as the result of the striking of the photons or charged particles on a secondary-electron emission layer.

The typical prior art secondary-electron multipliers are of the venetian blind type, box and grip type, etc., in which the dynodes are arranged in more than ten stages. They are of course very complex in construction, and many problems must be solved before they may be made compact in size and light in weight. Furthermore, a bank of resistors for dividing the voltage to be applied to the individual dynodes must be provided without the secondary-electron multiplier proper. The secondary-electron multipliers which are incorporated into the charged particle detectors, photon counters, camera tubes and image intersifiers which in turn are mounted on the rockets and satellites, must be small in size, light in weight yet very reliable in operation with the high gain. For this purpose, there has been devised and demonstrated a secondary-electron multiplier of the type in which the group of separate dynodes is replaced by a continuous high resistance surface which has the double function of emitting the secondary-electrons and dividing the voltage. The secondary-electron multiplier of the type described above is called the channel type secondary-electron multiplier, which may be further divided into (a) a parallel plate type secondary-electron multiplier and (b) a pipe type secondary electron multiplier.

The channel type is very simple in construction as compared with the separate dynode type, and is also very easy to operate because it has only two terminals. Furthermore, the channel may be reduced in size independently of the gain as long as the ratio $a = l/d$ is maintained constant, where $l$ = length of channel and $d$ *multipliers* diameter or spacing. Therefore, channel type secondary-electron multiliers may be made compact in size and light in weight, and still may have a high gain by increasing the voltage to be applied.

In the pipe type secondary-electron multipliers now available in the market, a glass or ceramic tube with a very small diameter is bowed or curved in the form of a spiral in order to prevent ion feedback. In general, the pipe type secondary-electron multipliers must be considerably elongated in length in order to improve the gain.

In the secondary-electron multipliers, the secondary electrons produced under applying the DC voltage are further accelerated and multiplied. For this purpose, the electro-conductive layer having the specific resistance of the order of $10^8 - 10^{10}$ ohm-cm must be provided. When the specific resistance is low, Joule heat is generated due to the high electric field applied to the secondary-electron multiplier in order to accelerate the electrons. On the other hand, when the specific resistance exceeds $10^{10}$ ohm-cm, the conductive layer becomes an insulating layer so that the portion where the secondary electrons are produced is positively charged. As a result, the supply of electrons is interrupted, and the conductive layer is consequently positively charged. Therefore, the conductive layer must have the specific resistance or volume resistivity of the order of $10^5 - 10^{10}$ ohm-cm.

So far in the inorganic materials only the vacuum evaporation process, the metal plating process or sputtering process was employed in order to form the layer. Except for some ion crystals which are not capable of forming a film or the like, they cannot be dissolved in a solvent, so that it has been impossible to provide an inorganic paint for forming the secondary-electron emission layer. Thus, it has been extremely difficult to coat the inner surface of a fine-diameter tube of the secondary-electron multipliers to form the secondary-electron emission layer. Therefore, there has been devised and demonstrated a method for reducing a lead glass tube in the hydrogen flow, thereby forming the lead conductive layer upon the inner surface of the tube. Furthermore, there has been also devised and demonstrated a bulk type secondary-electron multiplier of the type in which a tube is made of ceramic such as $BaTiO_3$ or $ZnTiO_3$. The glass and bulk type secondary-electron multipliers are difficult to fabricate and easily susceptible to damages under the mechanical shock or impact. Therefore, they cannot be incorporated in the detectors, image intensifiers or the like to be mounted upon the rockets and satellites which are subjected to considerably strong shock, impact and vibration.

In order to eliminate the above described problems, there have been devised and demonstrated secondary-electron multipliers of the type making use of the secondary-electron emission capability of the electron-conductive polymeric compositions, as disclosed for instance in Canada Pat. No. 883443 and Rev. Sci. Inst. 40(9) 1239 (1969). They are the bulk and flexible channel type, wherein the secondary-electron multipliers are provided by molding the electron-conductive polymeric compositions by making full use of the suitable molding properties flexibility of the high-polymer materials.

SUMMARY OF THE INVENTION

In view of the above, one of the objects of the present invention is to provide a surface and channel type secondary-electron multiplier which may be fabricated in a simple manner by making use of the electron-conductive polymeric compositions.

Another object of the present invention is to provide a surface and channel type secondary-electron multiplier which has the high resistance to mechanical impact and the high gain.

A further object of the present invention is to provide a surface and channel type secondary-electron multiplier wherein an accurately controlled layer, coating or film of the electron conductive high polymeric composition is formed in a simple manner upon the surface of a support or substrate made of an electrically insulating material by making the full use of the favorable property of the high polymers being dissolved into a solvent.

A further object of the present invention is to provide a surface and channel type secondary-electron multiplier wherein the accurately controlled charge-transfer organic semiconductive layer is formed upon the electron-donor high polymer support by the complex forming reaction between the support and the electron-acceptors.

A further object of the present invention is to provide a secondary-electron multiplier wherein the electron-conductive polymeric layer is formed over the inner surface of the pipe-shaped moldings or the porous holes of the foamed or otherwise support, thereby improving the gain and ensuring the reliable and dependable operation of the multiplier.

The above and other objects of the present invention may be attained by forming upon a support or substrate the secondary-electron emission layer consisting of the electron-conductive polymeric composition.

BRIEF DESCRIPTION OF THE DRAWING

FIG. 12A'–12B" shows the Table (I) of the maximum secondary-electron emission yields $\delta$max and maximum primary electron energis Ep(eV) required to yield said maximum emission yields $\delta$max of some organic crystal and polymer materials; and FIG. 13A and 13B shows the Table (II) of the maximum secondary-electron emission yields $\delta$max ionization potentials Is, the number $\pi e$ of $\pi$ electrons, the number of $\sigma_b$ of $\sigma$ bond out of $\pi$-electrons and the ratio $\sigma_b/\pi e$ in some organic materials.

DESCRIPTION OF THE PREFERRED EMBODIMENTS

Figure 1:
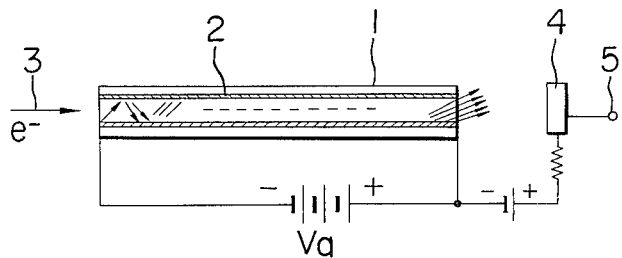
FIG. 1 is a schematic view of a prior art channel type secondary-electron multiplier.

Prior Art, FIG. 1

Referring to FIG. 1, there is shown one of the typical prior art secondary-electron multipliers. A lead glass tube 1 has its inner surface coated with a lead, electrically conductive layer 2 which may be formed by reducing the tube 1 in a hydrogen flow. The primary electrons $e^-$ 3 strike the layer 2, to which is applied the voltage V, to produce more secondary electrons, and the multiplied secondary electrons are attracted by a collector 4 so that an amplifier output signal current may be derived from an output terminal 5. The secondary-electron multipliers of the type described are difficult to manufacture and are easily susceptible to damages under shock or impact so that they cannot be mounted on rockets or satellites.

The Invention

In view of the above, the present invention has for its object to provide a secondary-electron multiplier of the type having a secondary-electron emission layer consisting of an electron-conductive polymeric composition. The electron-conductive, polymeric compositions used to form a secondary-electron emission layer must, of course, have an emission yield higher than unity. Therefore, the inventor made extensive studies of the previously disclosed reports concerning the secondary electron emission from the organic materials, and made extensive experiments as will be desribed hereinafter.

Figure 2:
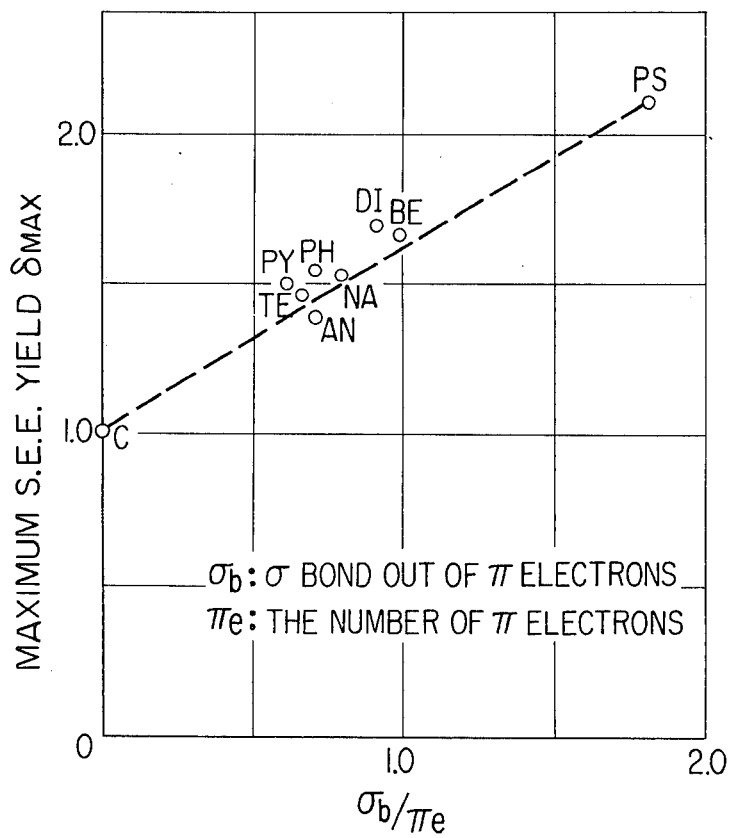
FIG. 2 is a graph plotted from the data shown in Table 2 and showing the relationship between the maximum secondary-electron emission yield and the molecular structure of the material used.

The table shown in FIG. 12 was plotted to show the relationship between the maximum secondary-electron emission yield $\delta$max of various crystals of organic materials and high polymer materials and the primary electron energy Ep to yield the maximum emission yield $\delta$max, the data being mainly obtained from the literatures 1) through 5) (see FIGS. 12A and 12B). It is seen that while the maximum emission yield $\delta$max of graphite is unity and is the lowest, other materials have the maximum emission yields higher than unity. The reason is that in graphite $\pi$ electron clouds extend infinitely while the molecules of other organic materials have $\sigma$-bonds and all of them are not covered with the $\pi$ electron clouds. It is therefore concluded that the greater the number of the $\sigma$ bonds, the higher the maximum emission yield $\delta$max becomes. Table II in FIG. 13 shows the number $\sigma e$ of $\sigma$ electrons and the number $\sigma_b$ of $\sigma$ bonds out of $\pi$-electron clouds, and the relationship between the ratio $\sigma_b/\pi e$ and the maximum emission yield $\delta$max is shown in FIG. 2. It is seen that the greater the ratio $\sigma b/\pi e$, the higher the maximum emission yield $\delta$max. (The error in measurement of the second electron emission ratio $\delta$ was $\pm$ 10%.) This is contrary to the characteristics of the electrical conductivity of the organic compounds, and shows that the higher the electrical conductivity, the smaller the secondary-electron emission yield $\delta$. This phenomenon is observed in graphite and diamond both of which consist of the same atoms, that is, carbon atoms. That is, while the maximum emission yield $\delta$max of graphite, which is of the $\pi$ bonded structure and is electrically conductive, is equal to unity, that of diamond, which is of the $\sigma$ bond structure and is electrically nonconductive, is 2.8.

Figure 3:
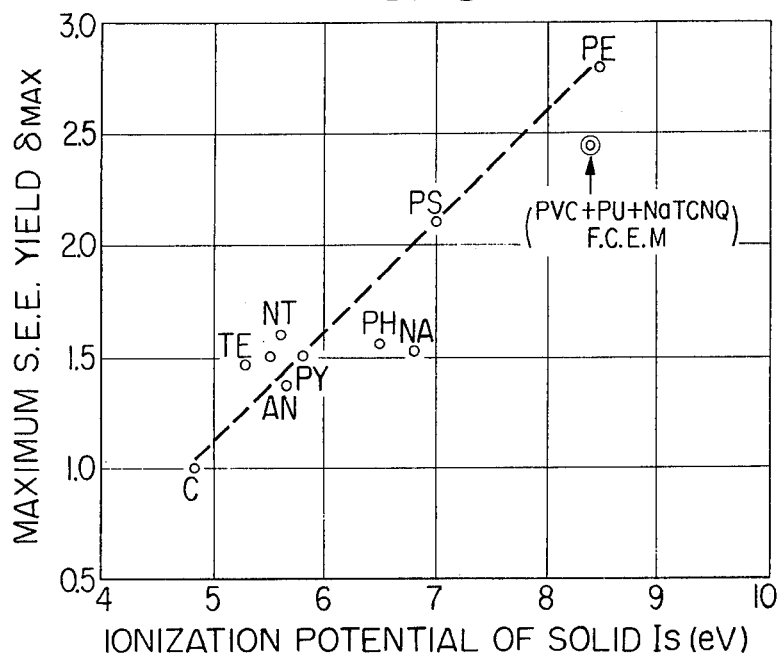
FIG. 3 is a graph plotted from the data shown in Table 2 and showing the relationship between the maximum secondary-electron emission yield and the ionization potential of the solids; the point PVC + PU + NaTCNQ - F.C.F.M. indicating the maximum emission yield at the ionization potential Is = 8.4 eV of the flexible channel type secondary-electron multiplier having the secondary-electron emission layer consisting of PVC + PU + NaTCNQ whose emission yield characteristic is shown in FIG. 5.

As the case of metals in which the higher the work function, the higher the maximum emission yield $\delta$max, the maximum emission yield $\delta$max of the organic compounds is closely correlated with the ionization potential of the solid as shown in FIG. 3 and 13, the data being obtained from the literatures 6) through 11) (see FIG. 13). That is, the higher the ionization potential of the organic compounds, the higher the maximum emission yield δmax. For instance, aliphatic compounds which have the σ bond groups have higher maximum emission yields than the aromatic compunds which hve the π bond. Since the hydrocarbon compounds have the ionizaton potential higher than graphite, the former have the maximum emission yield higher than unity, and as shown in FIG. 12 (Table I) the primary electron energy Epmax required for attaining the maximum emission yield is generally smaller as compared with the metals, and is distributed in the range from 200 to 300 eV. The reason why the primary electron energy Epmax is lower is that the organic compounds have a density lower than metals, whereby the deep penetration of electrons may be permitted. This means that the secondary-electron emission ratio δ is relatively higher even when the primary electrons have the energy lower than 200 eV. In general, inorganic compounds have the maximum emission yield δmax higher than the organic compounds have. However, the gain G of the secondary-electron multipliers is given by $$G = \delta^n$$

where $n$ = the number of collisions of primary electrons. Therefore, when the secondary-electron emission ratio δ is higher for the lower-energy primaries, the number of collisions is increased at a predetermined accelerating voltage. As a result, the gain G is more dependent upon $n$ than δ, and becomes a very high value.

Figure 4:
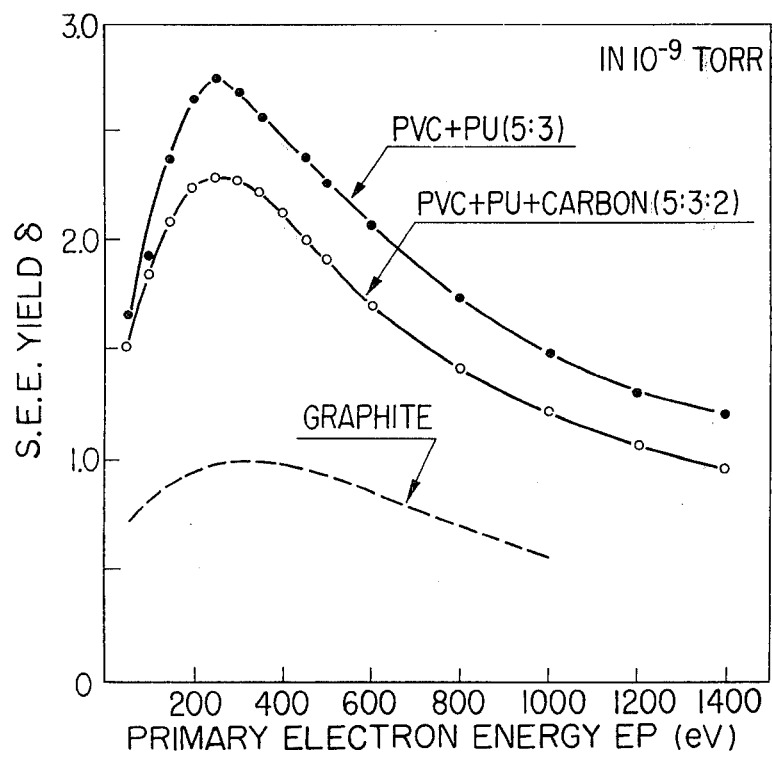
FIG. 4 is a graph showing the relationship between the secondary-electron emission yield $\delta$ and the primary electron energy Ep in eV of some high polymer compositions and graphite.
Figure 5:
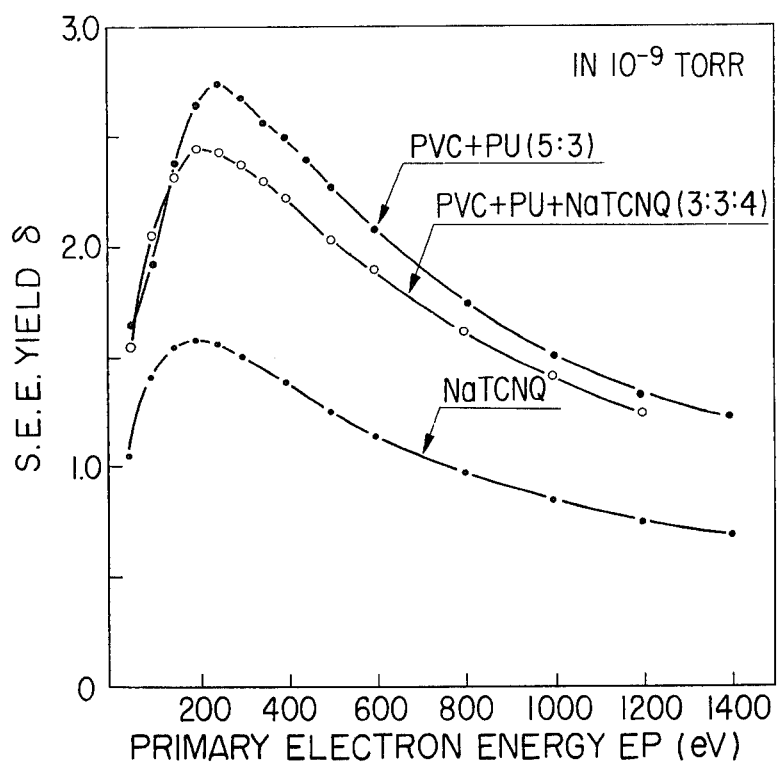
FIG. 5 is a graph illustrating the relationship between the secondary-electron emission yield $\delta$ and the primary electron energy Ep in eV of high polymeric compositions and NaTCNQ.

Next the secondary-electron emission ratio of the semiconductive polymeric compositions consisting of, for instance, high polymers and electro-conductive particles such as carbon black, VaTCNQ (Sodium 7.7, 8.8, Tetra cyanoquinodimethane salt) and so on. In general, when the electro-conductive particles are metals, the number of free electron is large and the electron emission yield δ is small. As the case of the electro-conductive carbon black the larger the number of conjugated π electrons, the lower the electrical resistance becomes, and the organic compounds with a large number of conjugated π electrons have the comparatively small electron emission yield between 1.0 and 2.0. However, when the electro-conductive particles with a low emission yield δ are blended with high polymers, the semiconductive compositions show the emission yields δ as shown in FIGS. 4 and 5 (the data being obtained from the experiments conducted by the inventor). It seen that the emission yield δ of the polymeric composition (PV + PU) blended with an electro-conductive particles is not so remarkably reduced. That is, the emission yield of the semiconductive composition is almost equal to that of the matrix polymer. The reason may be that when the samples were molded, the surface layer 20 to 30 A in thickness becomes rich with polymer layer which formed due to the bleed-out to the surface of the matrix polymer, so that the apparent emission yield may become almost equal to the emission yield δ of matrix polymer.

Since the secondary-electron multiplier described above is of the bulk type, there arises the problem of gas released in the high vacuum. Therefore, the present invention provides an excellent secondary-electron multiplier, wherein the secondary-electron emission layer made of the electron-conductive polymeric composition is fabricated only over the surface of substrate as will be described in detail hereinafter. The secondary-electron emission is effected only on the surface of the secondary-electron emission layer; that is, the surface layer only 20 to 30 A in depth. Therefore, satisfactory secondary-electron emission may be attained when the secondary-electron emission surface layer a few microns to tens of microns in depth is provided even without the use of a bulk type secondary-electron multiplier. In the surface layer type secondary-electron multipliers, the defect that the organic compounds release gases in high vacuum may be considerably improved as compared with the bulk type.

Accordingly to the present invention, there may be provided a secondary-electron multiplier which has the ease of fabrication high resistance to mechanical impact and high gain due to the elimination of ion feedback. Furthermore, the manufacture of the surface layer type secondary-electron multipliers may be much facilitated because the electro-conductive layer may be easily formed by utilizing the solubility of the organic compounds and the charge-transfer complex formation reaction.

The surface layer type secondary-emission multipliers in accordance with the present invention may be divided into (A) Coating Type Multiplier; in which the organic secondary-electron emission painted layer is prepared by making use of the excellent film-foaming-ability and high solubility of the high polymers, and is coated to substrate as electrically insulative pipe made of glass, ceramic, plastics, woods, rubber or the like or as porous moldings such as a channel plate, sponge, rubber or the like to form a secondary-electron emission layer; and (B) Charge-Transfer Complex Layer Type Multipliers, wherein the charge-transfer organic semiconductive surface layer is formed by the reaction between the electron-acceptors and the electrically insulative polymer pipe or porous polymer moldings both having a high electron emission yield δ and electron-donor properties, alternatively by dissolving the charge-transfer complex in the proximity of the surface of the high polymer.

The secondary-electron emission layer-forming paints used for the fabrication of the coating type secondary-electron multipliers (A) may be divided into 1. paint comprising a solution of thermoplastic resin wherein are dispersed the electrically conductive particles such as metals, metal oxides, carbon black, graphite, organic semiconductor or the like;

2. paint comprising a solution of uncured thermo-setting resin and the electrically conductive particles described in (1);

3. paint comprising a solution of a charge-transfer complex semiconductive polymeric composition; and 4. paint comprising paints (1), (2) and (3) in a suitable ratio.

After being coated the paint is dried or cured to form the secondary-electron emission layer. A paint consisting of electrically conductive paint or paste dispersed with silver or carbon particles is available commercially and is used to form an electrically conductive coating with the specific resistance less than $10^2$ ohm-cm. However, the paint (1) used in the present invention must form the coating having the specific resistance higher than $10^5$ ohm-cm. Such paint may be easily prepared by adding a small quantity of electrically conductive particles to the electrically insulative high polymer paste with a relatively high emission yield. The excellent secondary-electron emission coating or layer may be formed by applying the above paint. The high polymer compounds which may be used in the present invention are vinyl resins such as polyethylene, polyvinyl acetate, polypropylene, polyvinylidene chloride, polyvinyl chloride, polyacrylonitrile, polymethyl methacrylate, polystyrene and so on, and thermoplastic resins such as polyesters, polyamides, polyacetals and so on. It is preferable that they may be easily soluble in solvents and have a high emission yield $\delta$. Furthermore, since the secondary-electron multipliers operate in such vacuum higher than $10^5$ torr, it is preferable to use polymers whose released gas is minimum. Moreover, the solvents must have a low boiling point in order to ensure a short drying time. Such solvents are for example, water, alcohol, ketone, cellosolve, trichloroethylene, tetrahydrofuran, ethyl acetate, toluene and so on, which may be selected depending upon polymers to be used. The thickness of the coating and the easiness with which the coating process is accomplished may be easily controlled by adjusting the quantity of the solvent used.

The paint (2) is cured after it has been applied so as to form a stable coating. The thermo-setting resins which may be used in the present invention, are, for instance, phenol resins, epoxy resins, unsaturated polyester resins, melamine resins, silicon resins, polyurethane, etc., and suitable curing agents must be added. The selected thermo-setting resin and curing agent are dissolved or dispersed in a suitable solvent to prepare the paint (2), and the paint (2) is applied and cured to form the secondary-electron emission layer.

The paint (3) may be prepared by dissolving in suitable solvents electron-donor high polymer such as polyamides, polyurethane, polyvinyl pyrrolidone, polyvinyl pyridine, ionene, polyacryl amide, polyvinyl carbazole or copolymers thereof and electron-acceptors such as 7,7,8,8-tetracyanoquinodimethane, tetra cyano-ethylene, p-chloranil, or the complex salts thereof. These polymers have the specific resistance $10^5$ to $10^{10}$ ohm-cm, and the polymer molecular chains have the $\delta$bonds which exhibit the electrically insulating characteristic and high secondary-electron emission yield as well as the $\pi$ bonded chains which are electrically conductive, so that the excellent secondary-electron emission coating with the uniform conductivity and excellent secondary-electron emission capability may be provided. The above paints having the specific resistance from $10^8$ to $10^{10}$ ohm-cm in accordance with the present invention may be dissolved in a suitable solvent to prepare the paint solution or suspension.

Figure 6:
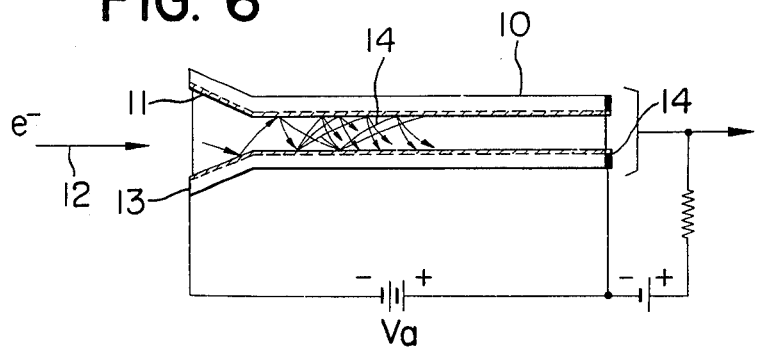
FIG. 6 is a schematic view of a channel type secondary-electron multiplier in accordance with the present invention.
Figure 7:
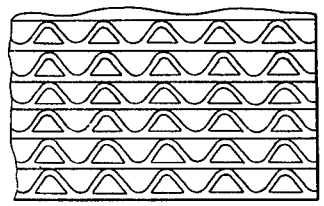
FIG. 7 is a schematic view of a support of a secondary-electron multiplier in accordance with the present invention adapted to be incorporated in an image intensifier.
Figure 8:
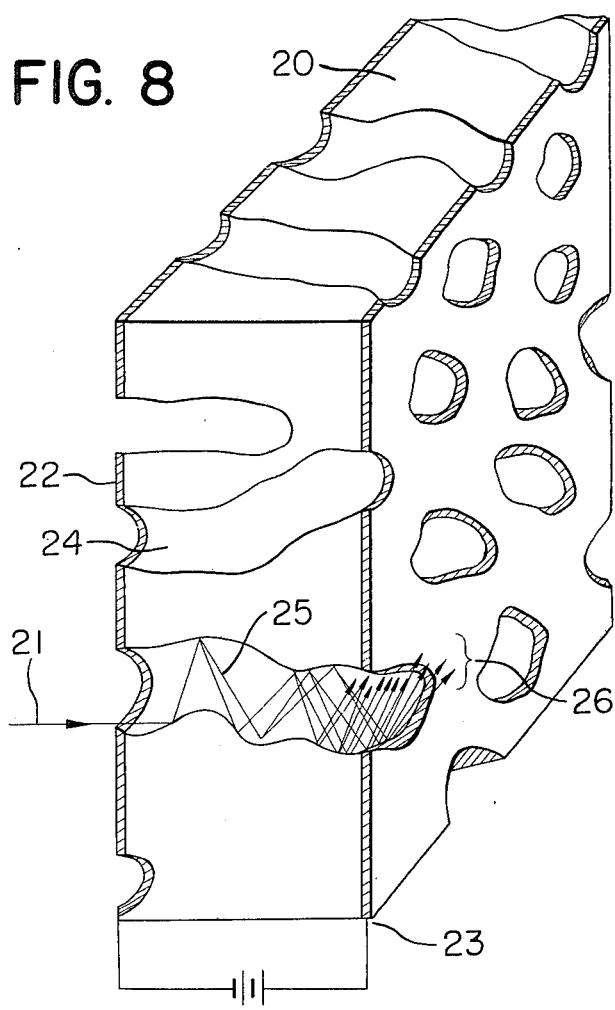
FIG. 8 is a fragmentary perspective view, partly in section, of a sponge-like support of a secondary-electron multiplier in accordance with the present invention adapted to be incorporated in an image intensifier.

These paints may be applied to suitable molded substrates such as those shown in FIGS. 6, 7 and 8 and made of electrically insulating materials such as glass, ceramic, plastics, rubber, woods or the like to form the secondary-electron emission coating or layer. When these paints are applied to the flexible plastic pipes, the flexible channel type secondary-electron multipliers may be provided. These plastic pipes may be bent or bowed so as to have a suitable radius of curvature, whereby the ion feedback may be eliminated, resulting in higher gain. Alternatively, the paints may be applied to various types of dynodes.

Next, for the fabrication of the charge-transfer complex layer type secondary-electron multipliers, nitrogen-containing polymers such as polyamide, polyimide, polyvinyl pyrrolidone, polyurethane, polyvinyl pyridine, ionen, polyacryl amide, polyvinyl carbazole, the copolymers thereof or the mixtures thereof may be used. Furthermore, sulphur-containing polymers such as polysulfone, polysulfoneamide, polysulfonium chloride polymer, the copolymers thereof or the mixture thereof may be used. High polymer compositions with the greater emission yield $\delta$ may also be prepared by blending the high polymer with an electron donor such as amine, aniline derivatives, tetrathiofluvalene (TTF) or phenothiazine. They exhibit the properties similar to those of the above electron-donor high polymers.

The above paints for forming the secondary-electron emission layer are adapted to be applied to the pipe-shaped support shown in FIG. 6, the channel plate shown in FIG. 7 and the sponge-like molded support shown in FIG. 8 and having a large number of porous holes or opened cells extending between the manor surfaces at right angles thereto. As will be described hereinafter in conjunction with some EXAMPLES of the present invention, the secondary-electron emission layer of a very large surface area may be easily formed by making use of the excellent film forming ability and or ease of fabrication of high polymers. Even though the gas-phase process such as vacuum evaporation may be used, it is preferable to use the liquid-phase process for forming the electro-conductive layer because the latter process is simple and permits the easy control of the resistance so that the excellent electro-conductive layer may be formed. For instance, the porous, molded support may be immersed for a predetermined time in the solution of 7,7,8,8-tetracyanoquinodimethane or p-chloranil so that the layer of charge-transfer complex may be formed upon or in the proximity of the surface of the support. When the electron-donor polymer is immersed into the solution of the charge-transfer complex, the charge transfer complex is dissolved into the surface of the electron-donor high polymer. Therefore, the electro-conductive layer may be formed in the proximity of the surface of the support by immersing the latter into the solution of the charge-transfer complex. After the immersion, the support is dried to remove the solvent. Unlike the electroplating or other coating processes, the electro-conductive layer strongly bonded to the support by the charge-transfer bonding is formed or the layer containing the charge-transfer complex is formed in the proximity of the surface of the support. The bonding is so strong that the separation of the conductive layer will not occur, and the uniform layer may be formed. Thus the excellent secondary-electron emission layer may be provided. Furthermore, as described above, when the paint is applied to the flexible pipe made of an electron-donor high polymer, and when the pipe is bent or bowed in a suitable manner, the high-gain, ion-feedback-free secondary-electron multiplier may be provided.

Next some EXAMPLES of the present invention will be described. EXAMPLES 1 through 6 are of the coating type while EXAMPLES 7 through 11, of the charge-transfer complex layer type.

EXAMPLE 1

Figure 9:
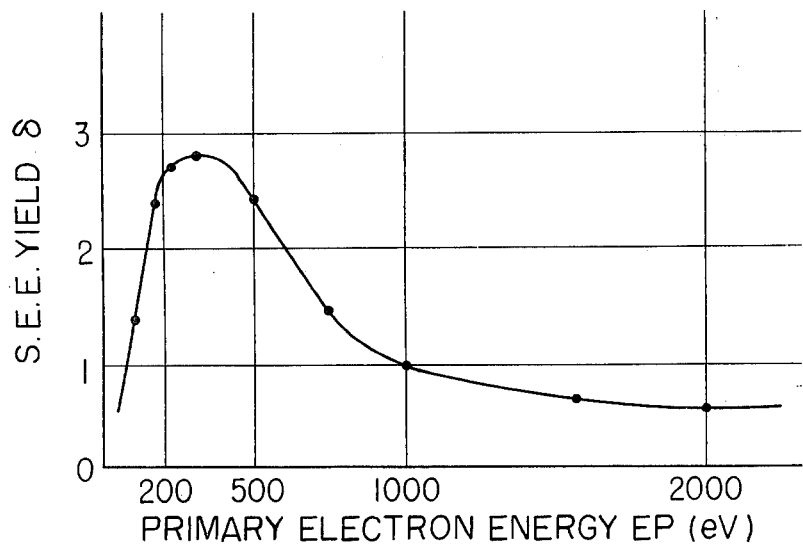
FIG. 9 is a graph illustrating the relationship between the secondary-electron emission yield $\delta$ and the primary electron energy in eV of the secondary-electron emission layer of EXAMPLE 1 of the present invention.
Figure 10:
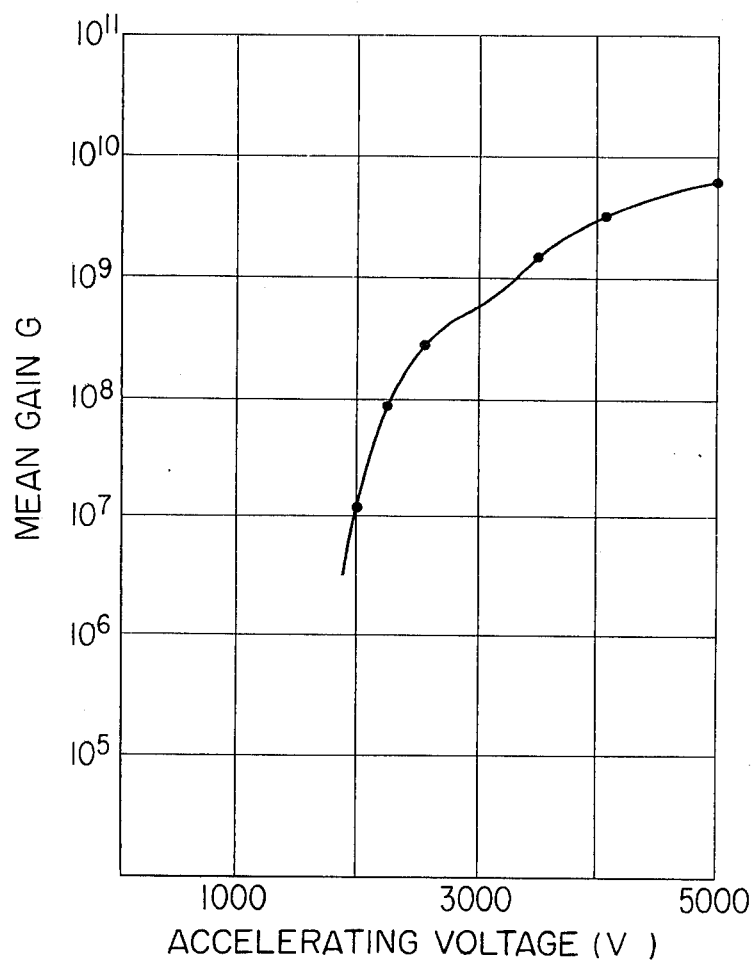
FIG. 10 is a graph showing the relationship between the gain G and the accelerating voltage in Va thereof.

30 grams of copolymer of ethylene-vinyl acetate and 70 grams of fine silver particles were dissolved into 200 grams of toluene to prepare the paint. The paint was coated twice over the inner surface of a polyethylene pipe 10 (See FIG. 6) with the inner diameter of 1.2 mm, the outer diameter of 3.6 mm and the length of 12 cm, whereby a layer 11 was formed. A silver paste electrode 13 was formed, and the resistance measured was $10^9$ ohms. The pipe 10 was bowed in the shape of an arc of radius of 4.5 cm, and was placed in vacuum of $2 \times 10^{-8}$ torr. The primary electrons 12 of 300 eV were accelerated at 3 KV to strike against the layer 11 to produce the secondary electrons 14. The gain was $5 \times 10^8$. The relationship between the emission yield $\delta$ and the primary electron energy Ep(eV) is shown in FIG. 9 while the relationship between the mean gain G and the accelerating voltage Va is shown in FIG. 10.

EXAMPLE 2

60 grams of polyvinyl chloride, 20 grams of glycol ester of sebacic acid (as plasticizer) and 20 grams of carbon black were dissolved and dispersed in 300 grams of tetrahydrofuran to prepare the paint. This paint was applied to the pipe 10 in the manner substantially similar to that of EXAMPLE 1. The gain was $6 \times 10^8$, which was measured under the same conditions as those of EXAMPLE 1

EXAMPLE 3

70 grams of epoxy resin and 7 grams of hexamethylene-tetramine as curing agent were dissolved into the solution consisting of 180 grams of methyl-ethyl ketone, 90 grams of toluene and 30 grams of butylcellosolve, and then 22 grams of acetylene black was added and mixed to prepare the paint. The paint was applied to the pipe 10 in a manner substantially similar to that of EXAMPLE 1 and then was cured at 100° C. The gain was substantially similar to that of EXAMPLE 1.

EXAMPLE 4

6 grams of channel black was added to 300 grams of polyimide varnish consisting of 15% polypyrromelimde dissolved into the solvent consisting of vinyl pyrrolidone and toluene to prepare the paint. The paint was applied in a manner similar to that of EXAMPLE 1, and was cured for 3 hours at 250° C. The gain was similar to that of EXAMPLE 1.

EXAMPLE 5

30 grams of Ionene-tetracyanoquinodimethane complex polymer having the following chemical structure

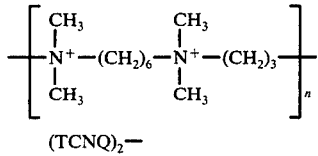

was dissolved into 200 grams of dimethyl formamide to prepare the paint. The paint was coated in a manner substantially similar to that of EXAMPLE 1, and the gain was $5 \times 10^8$.

EXAMPLE 6

30 grams of complex polymer consisting of tetracyanoquinodimethane and copolymer of poly-2-vinyl pyridine and vinyl acetate was dissolved into 200 grams of dimethyl formamide to prepare the paint. The paint was applied in a manner substantially similar to that of EXAMPLE 1, and the gain was $7 \times 10^8$.

EXAMPLES 1 through 6 are summarized in Table 3.

Table 3

| Examples | volume resistivity at 30° C ($\Omega$.cm) | resistance across pipe R ($\Omega$) | emission yield* ($\delta$) | gain** |
|---|---|---|---|---|
| 1 | $2 \times 10^6$ | $1 \times 10^9$ | 2.8 | $5 \times 10^8$ |
| 2 | $1 \times 10^7$ | $6 \times 10^9$ | 2.5 | $6 \times 10^8$ |
| 3 | $2 \times 10^6$ | $1 \times 10^9$ | 2.9 | $2 \times 10^9$ |
| 4 | $4 \times 10^5$ | $2 \times 10^8$ | 1.9 | $8 \times 10^7$ |
| 5 | $1 \times 10^7$ | $5 \times 10^9$ | 2.5 | $8 \times 10^8$ |
| 6 | $2 \times 10^6$ | $9 \times 10^8$ | 2.6 | $7 \times 10^8$ |

Remarks:
*measured with respect to the primary electron of 300 eV.
**measured with respect to the primary electrons of 300 eV at accelerating voltage of 3 KV.

The emission yield and gain characteristics of EXAMPLES 2 through 6 are substantially similar to those of EXAMPLE 1 shown in FIGS. 9 and 10, respectively.

When high polymers with high adhesive property are used, the adhesive capable of secondary-electron emission may be provided as with the case of EXAMPLES 1 and 3. The paints of EXAMPLES 1 and 3 may be, therefore, used as the adhesive for joining between the funnel portion of the secondary-electron multiplier and the pipe.

EXAMPLE 7

Figure 11:
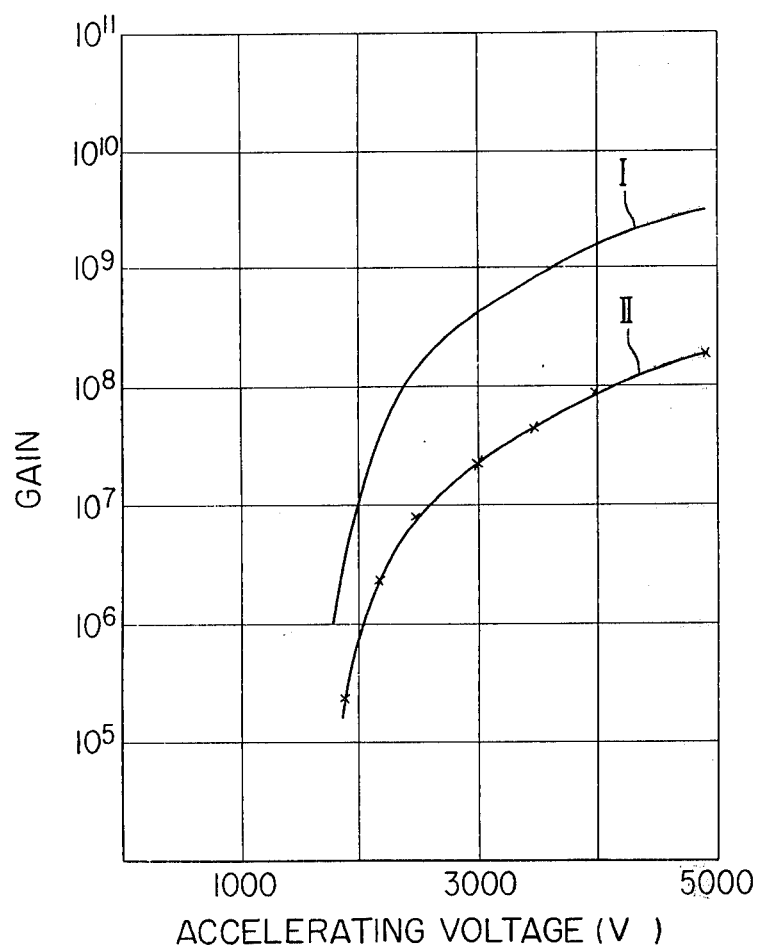
FIG. 11 shows the gain characteristic curves of EXAMPLES 7 and 8 of the present invention.

The copolymer of 2-vinylpyridine and ethylene was molded at 170° C into the pipe 10 shown in FIG. 6, and was immersed for 5 minutes in the methanol solution of tetracyanoethylene, and was dried at 80° C in the vacuum oven. Thus formed pipe was cut into the length of 12 cm, and the electrodes 13 and 14 are attached with Ag paint to the funnel portion and to the end of the pipe 10 opposite to the funnel portion. The resistance was $3 \times 10^9$ ohm. The pipe was bowed into the form of an arc of radius of 5 cm, and placed in vacuum of $1 \times 10^{-5}$ torr. The primary electrons of 300 eV was accelerated at 3.5 KV to strike the layer 11 to produce the secondary electrons. The gain was $4 \times 10^8$. The gain characteristic curve (I) is shown in FIG. 11.

EXAMPLE 8

Tetrasulfide polymer having the following chemical structure.

$$\left[ \begin{array}{c} CH_3-SSSS \\ \phantom{X} \\ \phantom{X} \\ CH_3 \end{array} \right]_n$$

was molded into the pipe 10 shown in FIG. 6, and the methanol solution of TCNQ at 50° C was poured into the pipe through the funnel portion to form the layer 11. The resistance measured under the same conditions with those of EXAMPLE 1 was $6 \times 10^9$ ohms, and the gain was $2 \times 10^7$ for the primary electrons of 300 eV accelerated at 4 KV. The gain characteristics curve (II) is shown in FIG. 11.

EXAMPLE 9

A polyurethane foam substrate 30 cm $\times$ 30 cm and one centimeter in thickness with porous holes extending between the major surfaces at right angles thereto was prepared. The support was immersed for ten minutes in the solution consisting of dimethyl formamide and triethyl ammonium (TCNQ)₂. Thereafter, the support was dried for one day at 90° C and 3 mm Hg, and the electrodes were attached, whereby the porous scondary-emission multiplier shown in FIG. 8 was provided. In FIG. 8, reference numeral 20 denotes the support; 21, the primary electrons; 22, an input electrode; 23, an output electrode; an 24, holes. When the primary electrons 21 strike the inner surface of the hole 25, the secondary electrons 25 are produced and multiplied whereby the amplified electrons 26 may be derived. The secondary-electron multiplier shown in FIG. 8 was incorporated into the image intensifier, and the excellent images were obtained.

EXAMPLE 10

1000 grams of polyvinyl chloride, 200 grams of polyester plasticizer and 50 grams of stabilizer were mixed, and 250 grams of amine having the following chemical structure

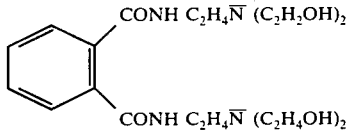

and having the high solubility relative to poly vinyl chloride was added. The mixture was mixed and blended at 170° C for 20 minutes with heated roller, and was formed into the sheet one milimeter in thickness. Furthermore, the sheet was corrugated, to provide the channel plate as shown in FIG. 7. The support was then immersed for ten minutes in the solution consisting p-chloranil and toluene, and dried at 80° C and 10 mm for 5 hours. Thus obtained secondary-electron multiplier was incorporated into the image intensifier.

EXAMPLE 11

The mixture consisting of 30 grams of NNN'N'-tetramethyl-p-phenylenediamine having the following chemical structure

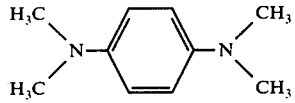

100 grams of polystyrene having the following chemical structure

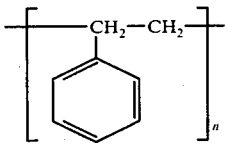

and 3 grams of stabilizer were mixed and blended and formed into pellets. Using these pellets and the process for forming foamed styrole, the sponge-like sheet, as shown in FIG. 8, one centimeter in thickness and having a large number of porous holes extending between the major surfaces at right angles thereto was provided. The support was immersed for ten minutes in the solution consisting of TCNQ and methanol, and dried at 80° C.

It is preferable to use the solvent which will not dissolve into the sponge-like or porous support. In case of the fabrication of the charge-transfer complex layer type secondary-electron multipliers, the thickness of the conductive layer may be controlled by making the use of the swelling of the support with the solvent. Since the sponge-like or porous support formed the secondary emission layer in accordance with the present invention have the molding properties substantially similar to that of the generator polymers, the conductive layer may be formed over a panel having a large surface area or porous panel.

The secondary-electron multipliers in accordance with the present invention are also sensitive, to the electrons, to vacuum ultraviolet photons, soft X-rays, and ions so that they may be used as the their detector. Thus, they find a variety of applications in ultraviolet photon image intensifiers, X-ray image intensifiers, mass spectrometers, cathode-ray image intensifiers and so on. Furthermore, they may be combined with suitable photoelectric emission materials so as to provide the optical image intensifiers.

What is claimed is:

1. In a dynode for a secondary electron multiplier having a dynode support or substrate made of an electrically insulating material and a secondary electron emissive and electron conductive layer formed upon a surface of said support or substrate the improvement which comprises forming said electron emissive and electron conductive layer from a high polymer composition emitting more secondary electrons than primary electrons by coating said support or substrate with a paint comprising said polymer composition dissolved in a solvent into which are dispersed electro-conductive particles.

2. The dynode of claim 1 wherein said polymer composition dissolved in said solvent is a thermoplastic resin.

3. The dynode of claim 1 wherein said polymer composition comprises an uncured thermosetting resin and a curing agent.

4. In a dynode for a secondary electron multiplier having a dynode support or substrate made of an electrically insulating material and a secondary electron emissive and electron conductive layer formed upon a surface of said support or substrate the improvement which comprises forming said electron emissive and electron conductive layer from a high polymer composition emitting more secondary electrons than primary electrons by coating said support or substrate with a paint comprising a charge-transfer complex type semiconductive high polymer and a solvent.

5. The dynode of claim 1 wherein said coated support or substrate is a porous or foamed composition.

6. The dynode of claim 4 wherein said support or substrate which is coated with said paint comprises a porous or foamed composition.

7. In a dynode for a secondary electron multiplier having a dynode support or substrate made of an electrically insulating material and a secondary electron emissive and electron conductive layer formed upon a surface of said support or substrate the improvement which comprises forming said support or substrate from a nitrogen- or sulfur-containing electron donor high polymer composition and said secondary electron emissive and electron conductive layer from a high polymer composition emitting more secondary electrons than primary electrons and including a charge-transfer complex produced by introducing an electron acceptor or its salt into a surface of said support or substrate.

8. A dynode of claim 7 wherein said electron acceptor is a composition selected from the group consisting of 7,7,8,8-tetracyanoquinodimethane, p-chloranil and tetracyanoethylene.

9. The dynode of claim 7 wherein said electron donor high polymer composition includes polyurethane.

10. The dynode of claim 7 wherein said support or substrate is in the form of at least one pipe.

11. A dynode for a secondary electron multipler comprising a dynode support or substrate made of an electrically insulating material and a secondary electron emission layer of a secondary emission yield higher than 1 comprising an electron conductive high polymer composition of resistivity of $10^5$–$10^{10}$ ohm.cm formed upon a surface of said support or substrate by coating said support or substrate with a paint comprising a thermoplastic resin dissolved in a solvent into which are dispersed electrically conductive particles.

12. A dynode as set forth in claim 11 wherein said support or substrate is in the form of at least one pipe.

13. A dynode of claim 1 wherein a high polymer included in said electron conductive high polymer composition is a vinyl polymer or copolymers thereof.

14. The dynode of claim 13 wherein said vinyl polymer is a polyvinyl halide or copolymers thereof.

* * * * *

UNITED STATES PATENT OFFICE
CERTIFICATE OF CORRECTION

Patent No. 4,071,474          Dated January 31, 1978

Inventor(s) Yoshio Kishimoto

It is certified that error appears in the above-identified patent and that said Letters Patent are hereby corrected as shown below:

Figure 12B", last line: Change "EX. DATA FROM EXPERIMENTS" to --DATA FROM EXPERIMENTS--.

Column 1, line 26: "intersifiers" should be --intensifiers--.

line 61: "$10^8 - 10^{10}$" should be --$10^5 - 10^{10}$--.

Column 2, line 41: "properties flexibility" should be --properties and flexibility--.

Column 3, line 25: "F.C.F.M." should be --F.C.E.M.--.

line 61: "energis" should be --energies--;

"Ep(eV)" should be --$Ep_{max}$(eV)--.

Column 4, line 11: "V" shold be --Va--.

line 31: "desribed" should be --described--.

Column 5, line 8: "hve" should be --have--.

line 38: "VaTCNQ" should be --NaTCNQ--.

Column 6, line 17: After "fabrication" insert a comma.

line 42: "dissolving" should be --introducing--.

UNITED STATES PATENT OFFICE
CERTIFICATE OF CORRECTION

Patent No. 4,071,474     Dated January 31, 1978

Inventor(s) Yoshio Kishimoto

It is certified that error appears in the above-identified patent and that said Letters Patent are hereby corrected as shown below:

Column 6, line 48: "the" should be deleted.

Column 7, line 1: "insulative" should be --insulating--.

line 14: "$10^5$ torr" should be --$10^{-5}$ torr--.

line 39: "tetra cyano-ethy-" should be --tetra-cyano-ethy- --.

Column 8, line 1: "ionen" should be --ionene--.

Column 9, line 2: "ohms" should be --ohm--.

line 4: "$10^{-8}$ torr" should be --$10^{-5}$ torr.

Column 10, Table 3, under "gain**", 2nd line from bottom: "$8 \times 10^8$" should be --$5 \times 10^8$--.

Column 11, line 4: "scondary-" should be --secondary- --.

UNITED STATES PATENT OFFICE
CERTIFICATE OF CORRECTION

Patent No. 4,071,474　　　　　　　　　Dated January 31, 1978

Inventor(s)　　Yoshio Kishimoto

It is certified that error appears in the above-identified patent and that said Letters Patent are hereby corrected as shown below:

Column 11, line 37: "10 mm" should be --10 mm Hg--.

Column 12, line 12: "generator" should be --general--.

Signed and Sealed this

Twenty-sixth Day of September 1978

[SEAL]

Attest:

RUTH C. MASON
*Attesting Officer*

DONALD W. BANNER
*Commissioner of Patents and Trademarks*